United States Patent [19]

Ogisu et al.

[11] Patent Number: 5,446,875
[45] Date of Patent: Aug. 29, 1995

[54] SYSTEM TO PASS THROUGH RESOURCE INFORMATION

[75] Inventors: Yukihisa Ogisu; Kunio Shimizu, both of Numazu, Japan

[73] Assignee: Fujitsu Limited, Kawasaki, Japan

[21] Appl. No.: 181,368

[22] Filed: Jan. 14, 1994

Related U.S. Application Data

[63] Continuation of Ser. No. 568,513, Aug. 16, 1990, abandoned.

[30] Foreign Application Priority Data

Aug. 17, 1989 [JP]  Japan .................................. 1-211991
Oct. 13, 1989 [JP]  Japan .................................. 1-266425

[51] Int. Cl.$^6$ ........................ G06F 11/14; G06F 12/16
[52] U.S. Cl. ............................ 395/575; 364/DIG. 1; 364/285.2
[58] Field of Search ...................... 395/575; 364/285.2

[56] References Cited

U.S. PATENT DOCUMENTS

| | | | |
|---|---|---|---|
| 4,751,702 | 6/1988 | Beier et al. | 371/9.1 |
| 4,819,232 | 4/1989 | Krings | 371/9.1 |
| 4,823,261 | 4/1989 | Bank et al. | 364/575 |

FOREIGN PATENT DOCUMENTS 0156179  10/1985  European Pat. Off. .

OTHER PUBLICATIONS

Ouchi, et al., "Check Point Copy for A Two-State Store" IBM Technical Disclosure Bulletin, vol. 20, No. 5, Oct. 1977, pp. 1955–1958, New York.
Lai, W. "The Integrity of Data Delivery in Computer Networks", *IEEE Trans. on Communications*, vol. COM-33, No. 11, Nov. 1985, pp. 1222–1224.
"Rolling Checkpoint in A Transaction Processing System" IBM Technical Disclosure Bulletin, vol. 30, No. 6, Nov. 1987, pp. 351–353, New York.

*Primary Examiner*—Stephen M. Baker
*Attorney, Agent, or Firm*—Staas & Halsey

[57] ABSTRACT

A system for passing through resource information in a computer system including an actual process, a back-up process, and a shared memory connected to the actual process and the back-up process. The actual process includes information which is stored in the shared memory and passed through to the back-up process by passing the contents of the shared memory to the back-up process. The back-up process performs an operation as a new actual process after being passed the contents of the shared memory when the actual process is not operable. The shared memory includes two sets of areas which respectively include an original information area storing information which is transmitted from the actual process to the back-up process, and a difference area storing information related to a change when the actual process changes the original information area. The back-up process reads out information stored in a difference area of one of the two sets of areas and passes through the information stored therein related to the change. The actual process stores the changed information that is transmitted to the back-up process in the original information area of the back-up process and stores the information related to the change in the difference area of the back-up process. The original information stored in the original information area of an other of the two sets of areas is copied and the two sets of areas are switched when at least one of a preset time interval is reached and a preset volume stored in the difference area is reached. In an alternative embodiment, the information passed from the actual process to the back-up process is divided into two groups according to the frequency of change of the resource information. The resource information in a first group is passed through in a batch to the back-up process when the actual process crashes. The resource information in a second group is passed through to the back-up process intermittently after preset time intervals or after volumes of changed information reach a preset threshold.

13 Claims, 14 Drawing Sheets

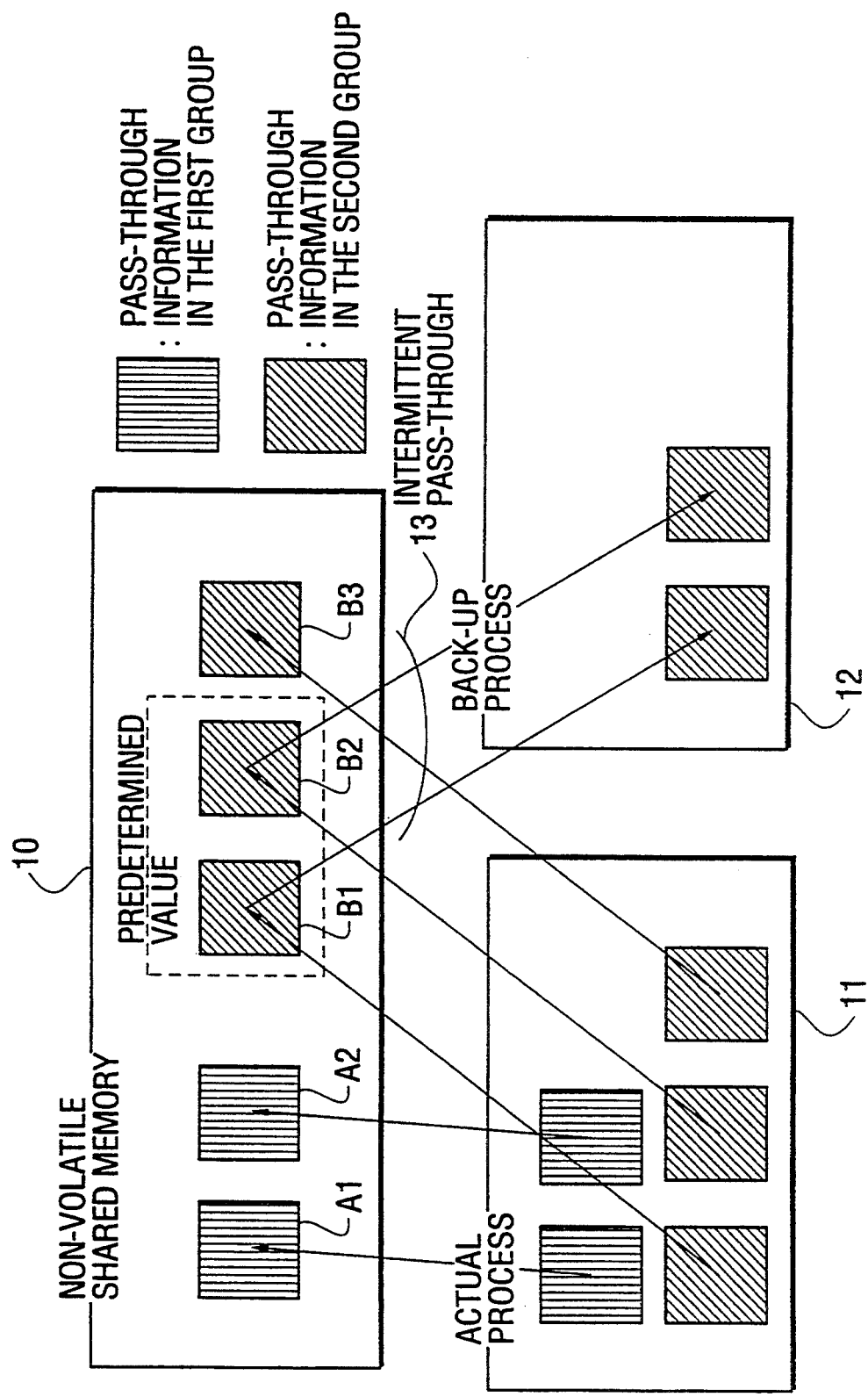

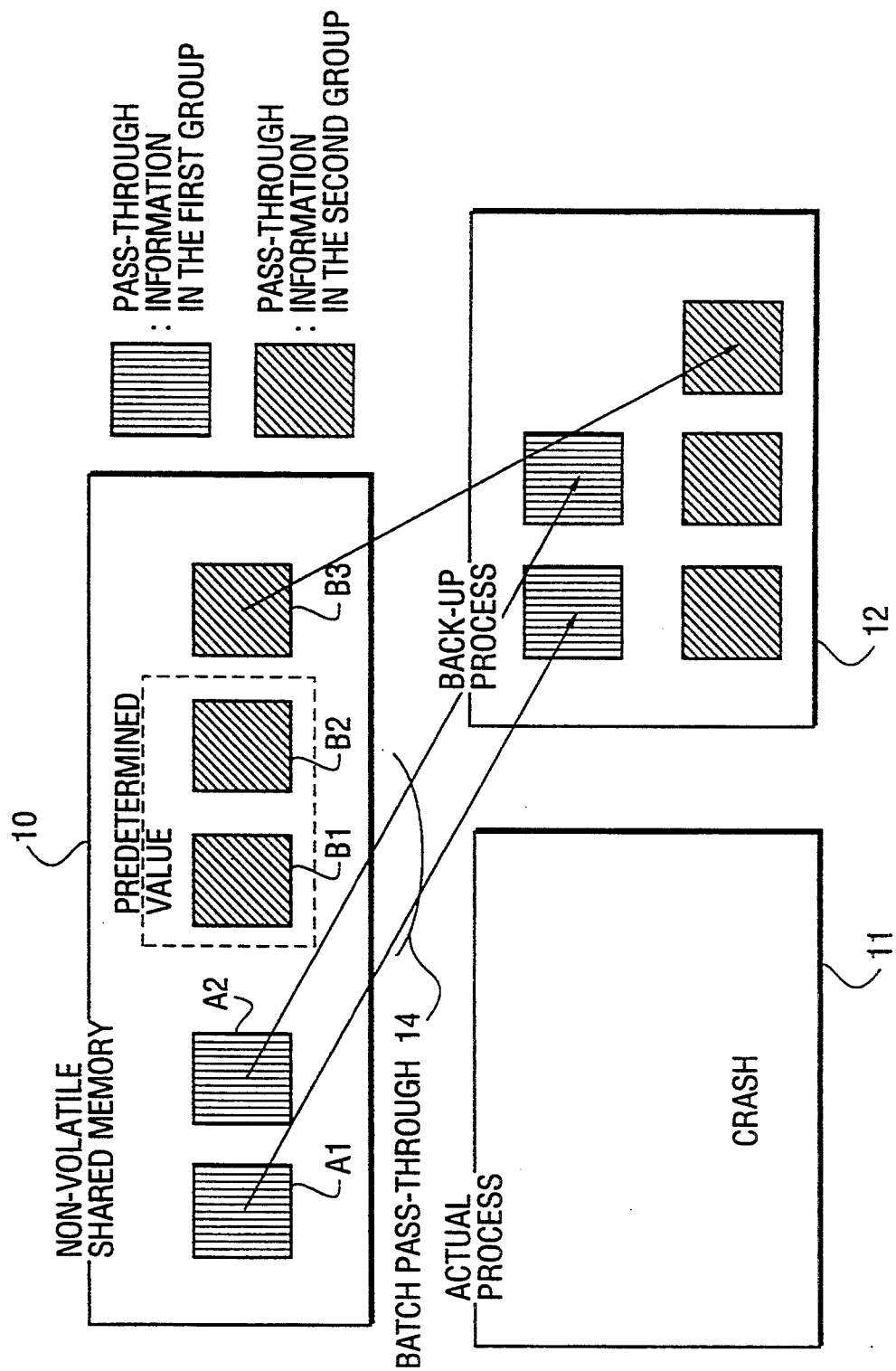

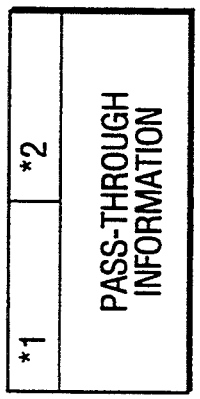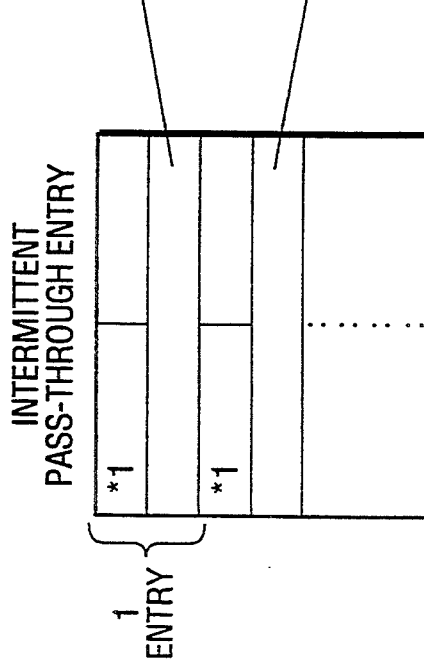

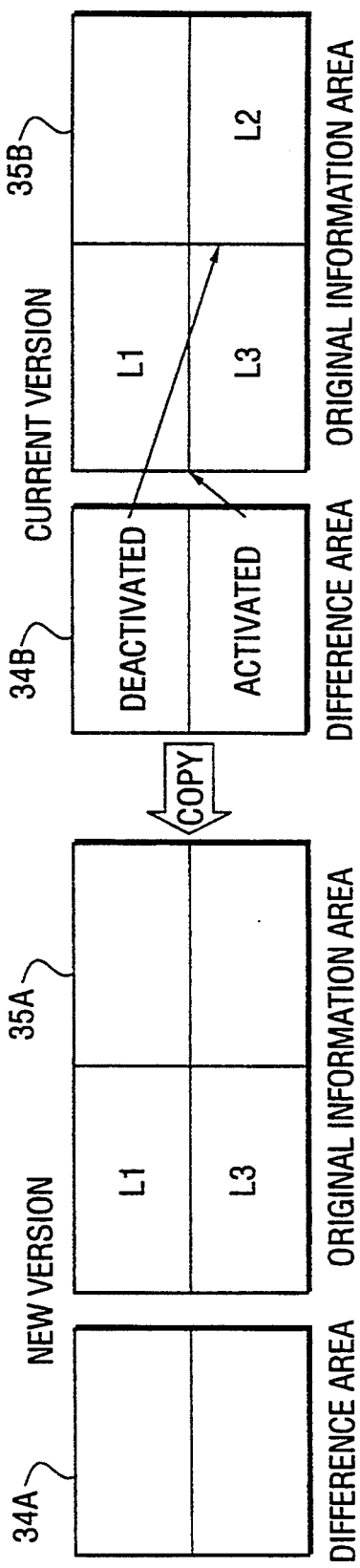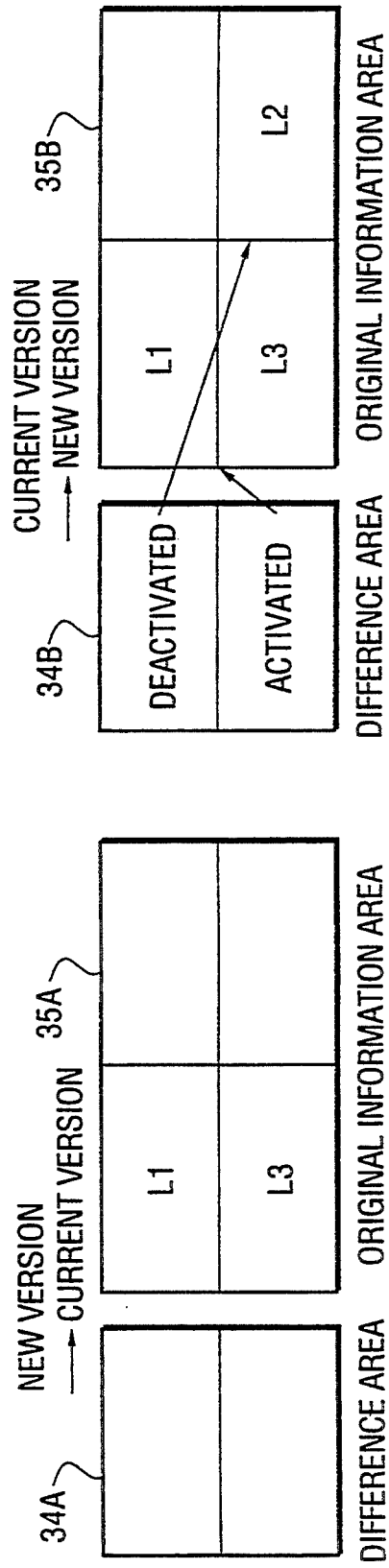

SYSTEM TO PASS THROUGH RESOURCE INFORMATION

This application is a continuation of application Ser. No. 07/568,513, filed Aug. 16, 1990, now abandoned.

BACKGROUND OF THE INVENTION

This invention relates to a data assurance processing system for handling passed-through information. It makes fault tolerant a computer system whose back-up process takes tasks over continually from an actual process at failure by passing through information stored in a shared memory (such as a non-volatile shared memory) from the actual process to the back-up process.

An effective way of making a computer system fault tolerant is to have two controlling processes: one for a normal operation, and the other as a back-up for continuing a controlling operation in the event of a failure of the controlling process for the normal operation.

The former controlling process is called an actual process and the latter is called a back-up process.

In case of a fault, various resource information must be passed through to switch a process from the actual process to the back-up process. A system of passing through the resource information at high speed and with surety is sought.

The resource information can be effectively passed from the actual process to the back-up process through a non-volatile shared memory such as a semiconductor external memory device, commonly accessible by the two processes.

Two methods can be considered for passing resource information through a non-volatile shared memory.

One is to pass the resource information in a batch at a crash time of the actual process.

The other is to pass the resource information sequentially when the actual process is operating.

It is possible to speed up the switching by a certain degree by passing resource information from the actual process to the back-up process through the non-volatile shared memory. However, the switching performance is affected as the volume of the resource information becomes larger.

As discussed before, the back-up process 32 must take over a dynamically changing operating environment handled by the actual process 31, when the actual process 31 is caused to fail by faults.

If the information for carrying over the operating environment is set to be passed in a batch at a crash time of the actual process 31, the performance of switching from the actual process 31 to the back-up process 32 deteriorates, because it takes time to set the operating environment based on the passed-through information.

In short, the first method, in which the resource information is passed through in a batch at the crash time of the actual process, has a problem of switching performance deterioration. This is because it takes time to transmit and set all resource information at the crash time.

The second method, in which the resource information such as the operating environment is passed through sequentially when the actual process 31 is operating, is as shown in FIG. 1.

When the operating environment for controlling the network resources is built in advance, certain conditions must be met if the second method is adopted, where the actual process 31 writes the changed operating environment information in non-volatile shared memory 30 and the back-up process 32 is notified at a certain time interval or when the volume of changed information reaches a predetermined value. Those conditions are as follows.

(1) There is no deterioration in the performance (processing step) compared with the operation of the actual process 31. That is, the actual process 31 is unaffected by the intermittent advance building of the operating environment in the back-up process 32.

(2) The same data at the same time are assured for the back-up process 32 as for the actual process 31.

The second prior art method cannot yet meet the above two conditions simultaneously, since an area of non-volatile shared memory 30 is used only as a single structure. For instance, data integrity cannot always be guaranteed when the back-up process 32 simultaneously reads the portion being written by the actual process 31. If an exclusive control such as a lock control is made to counter this, the processing of the actual process 31 can be kept waiting, and a problem of slow response may arise in an ordinary operation.

SUMMARY OF THE INVENTION

An object of the present invention is to solve the above problems and to make the advance building of the operating environment for fault tolerance efficient and sure.

A feature of the present invention resides in a system to pass-through resource information characterized by switching two sets of areas each storing the actual process and the back-up process, with the two sets described as follows. In a computer system with an actual process and a back-up process that passes through resource information necessary to continue handling tasks stored in a shared memory from the actual process to the back-up process at least at a crash time of the actual process, two sets of areas composed of an original information area that stores information that must be transmitted from the actual process to the back-up process and a difference area that memorizes the information related to the change when the actual process changes the original information area are set in the shared memory, the back-up process reads out the pass-through information stored in the difference area of the one of the two sets and passes through the information related to the change, the actual process stores the changed information that must be transmitted to the back-up process to the original information area of the back-up process and the information related to the change to the difference area of the back-up process and copies the original information memorized in the original information area of the other set by at least one of the criteria of a preset time interval or a preset volume stored in the difference area.

BRIEF DESCRIPTION OF THE DRAWINGS

FIGS. 2A and 2B are drawings which explain the first principle of this invention.

FIGS. 4A and 4B show an example of the data structure of the pass-through information related to the first embodiment of this invention.

FIGS. 11A through 11F are a processing example related to the second embodiment of this invention.

DESCRIPTION OF THE PREFERRED EMBODIMENTS

FIGS. 2A and 2B are drawings which explain the first principle of this invention.

Figure 10:
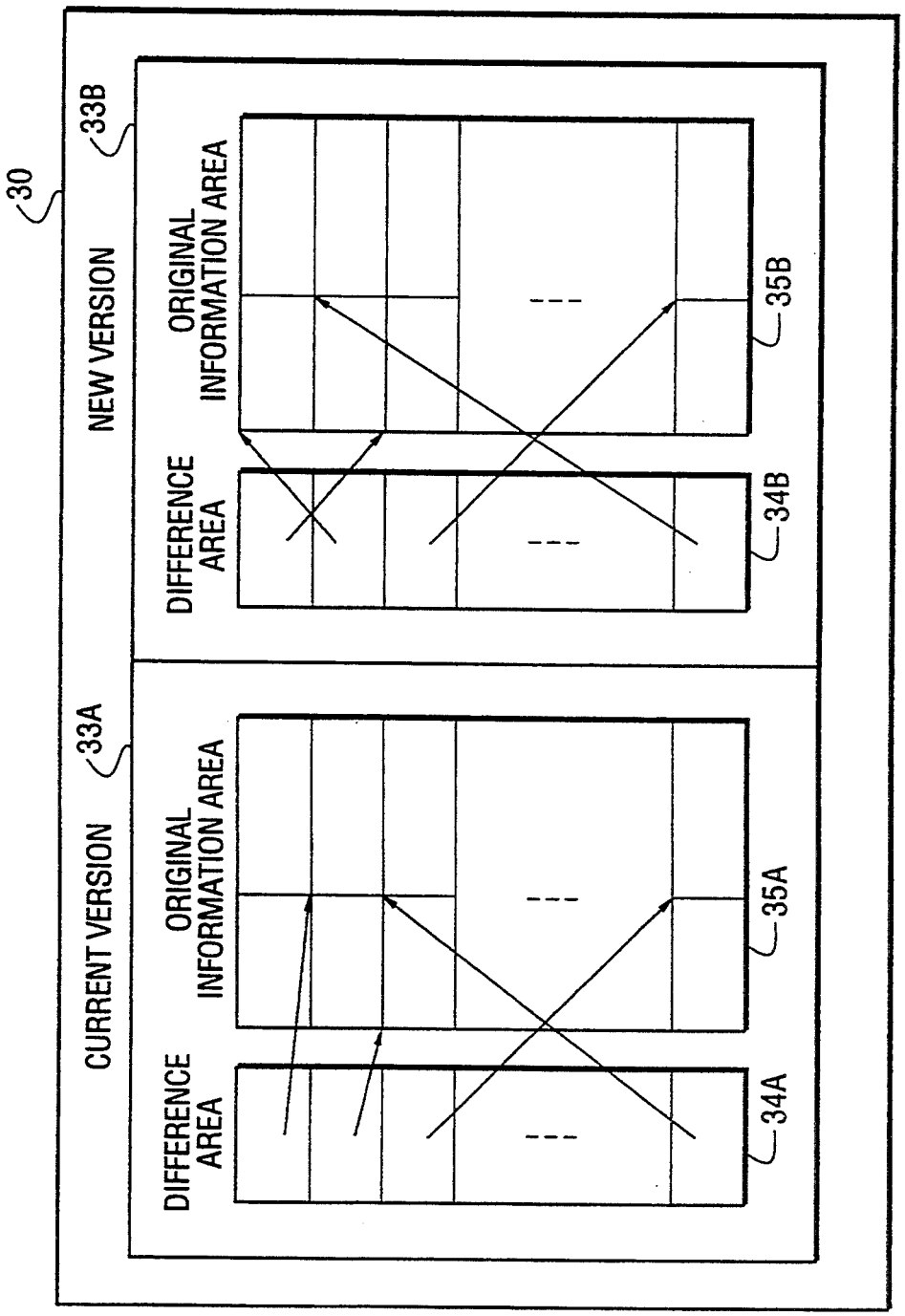
FIG. 10 is a data structure in a non-volatile shared memory area related to the second embodiment of this invention.

In FIGS. 2A and 2B, 10 is a non-volatile shared memory, 11 is an actual process for an ordinary operation, 12 is a back-up process waiting to continue tasks at the failure time of the actual process 11, 13 is a processing of the intermittent pass-through, 14 is a processing of the batch pass-through.

Also, A1, A2, B1–B3 represent the resource information to be passed through.

In this invention, resource information passed through from the actual process 11 to the back-up process 12 is preclassified into two groups in accordance with a frequency of change. The first group consists of constantly changing pass-through information such as about a condition change like pass-through information during a data transmission or during establishing of a connection, etc. Meanwhile, the second group consists of pass-through information, such as about completion of a connection, which changes only once in a while instead of continually. i.e., the first group has resource information with relatively high change frequencies, and said second group has that with relatively low change frequencies. Resource information herein refers to the information which is required for being passed through to make the system fault-tolerant.

As shown in FIG. 2A, the actual process 11 writes the changed resource information in the non-volatile shared memory 10 when the pieces of resource information are changed during an ordinary operation. Of the pieces of resource information, the pieces of pass-through information A1 and A2 in the first group are stored in the non-volatile shared memory 10, as they are.

The pieces of pass-through information B1–B3 in the second group are intermittently passed through to the back-up process 12 at a set time interval or when the amount of change information reaches a preset predetermined value. In FIG. 2A, the back-up process 12 takes in the bits of information into itself, because the amounts of pass-through information B1 and B2 reach the predetermined value.

When the actual process 11 is crashed due to a fault, all the pass-through resource information must be passed through to the back-up process 12, so that the back-up process 12 can continue the tasks handled by the actual process 11. Therefore, as shown in FIG. 2B, the back-up process 12 takes over the bits of pass-through information A1, A2 and B3 not yet completely carried over during an ordinary operation, when it is notified of the crash of the actual process 11. Bits of pass-through information A1 and A2 in the first group are carried over in a batch. Among the bits of pass-through information in the second group, only the remaining ones not passed through in the intermittent pass-through processing 13 are carried over.

The bits of pass-through information, A1 and A2, in the first group with high change frequencies are carried over from the actual process 11 to the back-up process 12 in the batch pass-through processing 14 at a crash time of the actual process 11, as shown in FIG. 2B. Thus, the overhead for the pass-through during an ordinary operation of the actual process 11 can be reduced.

The bits of pass-through information, B1–B3, in the second group with low change frequencies are carried over from the actual process 11 to the back-up process 12 in the intermittent pass-through processing 13 during an ordinary operation, as shown in FIG. 2 A. Namely, since the bits of pass-through information B1 and B2 have already been passed-through during an ordinary operation, the back-up process 12 takes over, at a crash time of the actual process 11, only the bits of pass-through information A1 and A2 in the first group and B3 in the second group not carried over during an intermittent pass-through. Consequently, when the actual process 11 is crashed, bits of information already passed through by the intermittent processing 13 need not be carried over, and the processing time required for the information carrying-over can be reduced, thereby improving the switching performance.

As described above, considering such as the change frequencies of resource information, the joint use of the batch pass-through processing 14 and the intermittent pass-through processing 13 enables an efficient reduction in overhead both during an ordinary operation and at a crash time.

Figure 1:
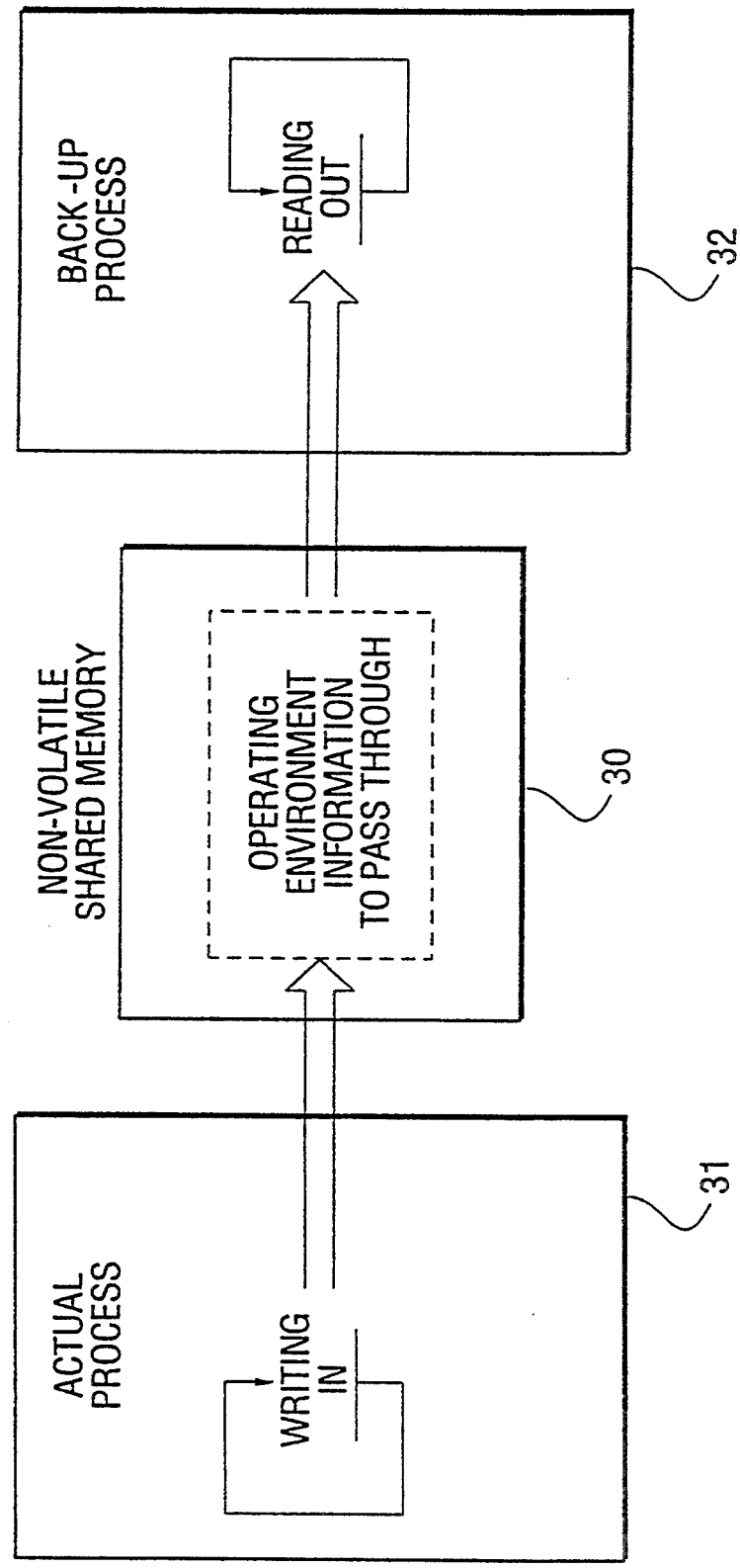
FIG. 1 shows an example of the prior art.
Figure 3:
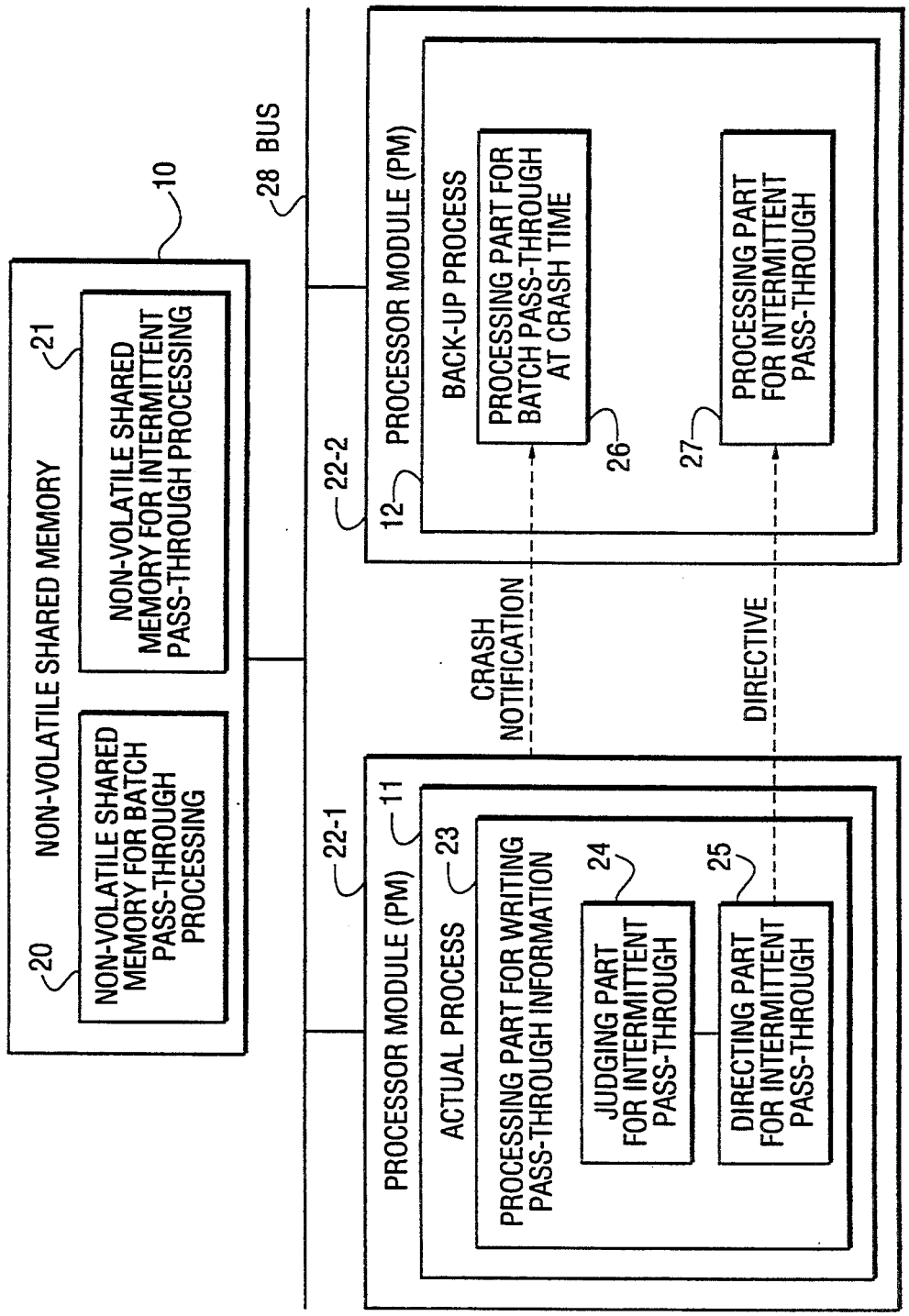
FIG. 3 shows a first preferred embodiment of this invention.
Figure 5:
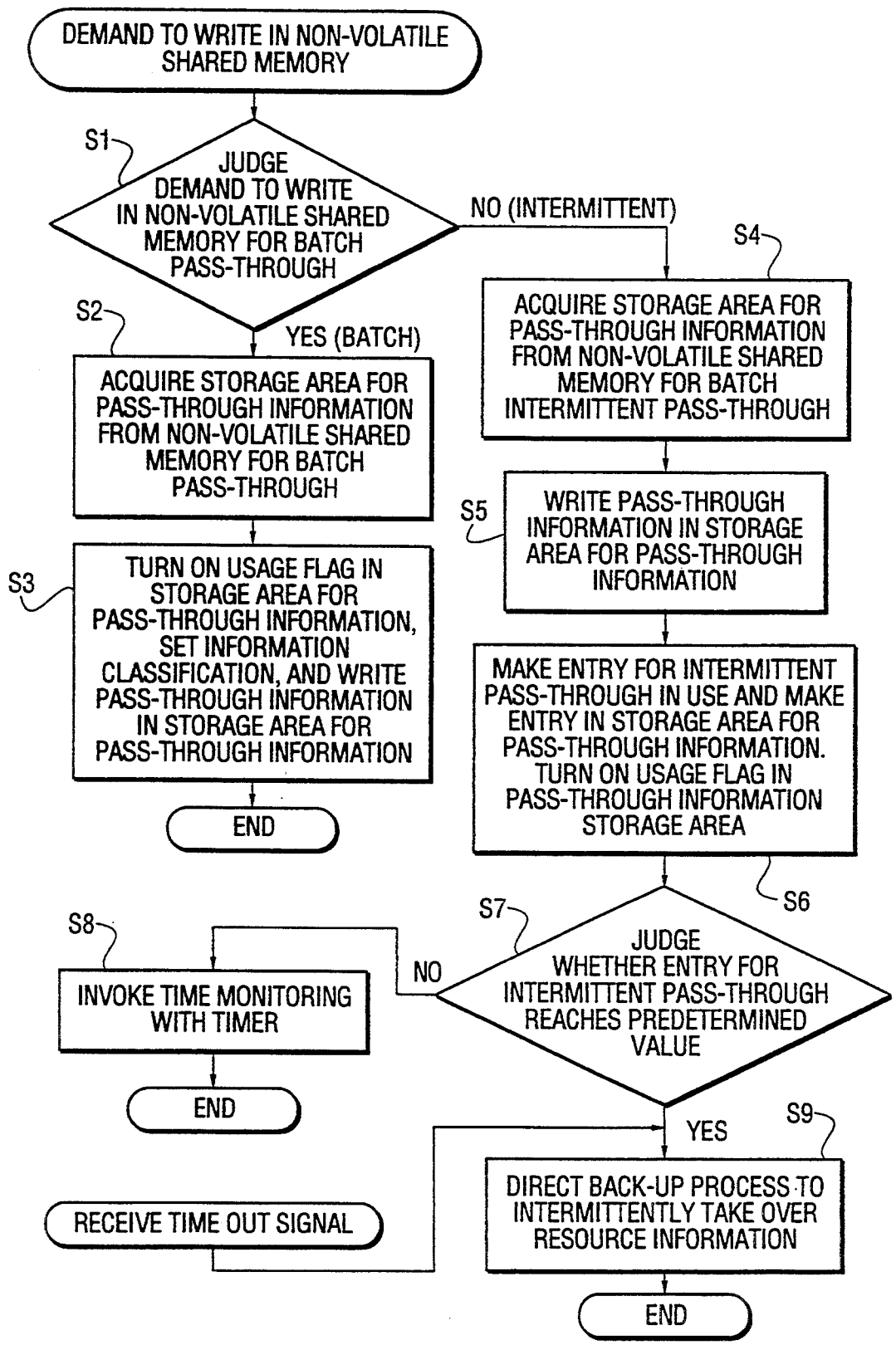
FIG. 5 is a processing flow chart of the actual process during an ordinary operation related to the first embodiment of this invention.
Figure 6:
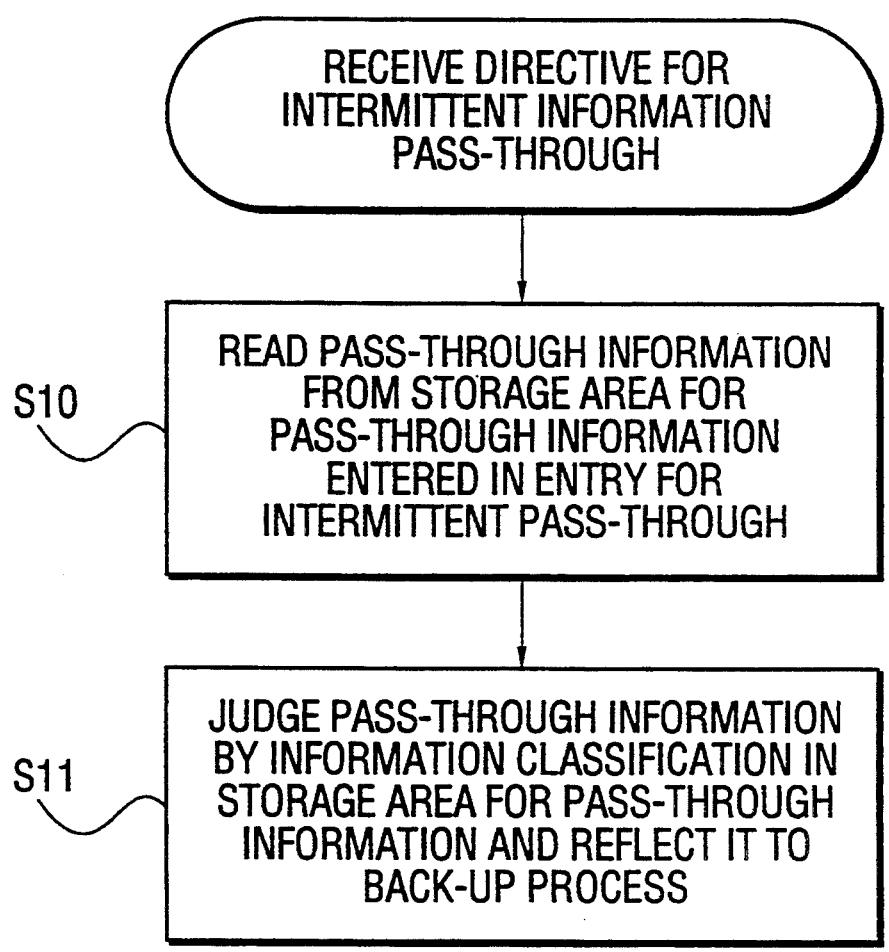
FIG. 6 is a processing flow chart of the back-up process during an ordinary operation related to the first embodiment of this invention.
Figure 7:
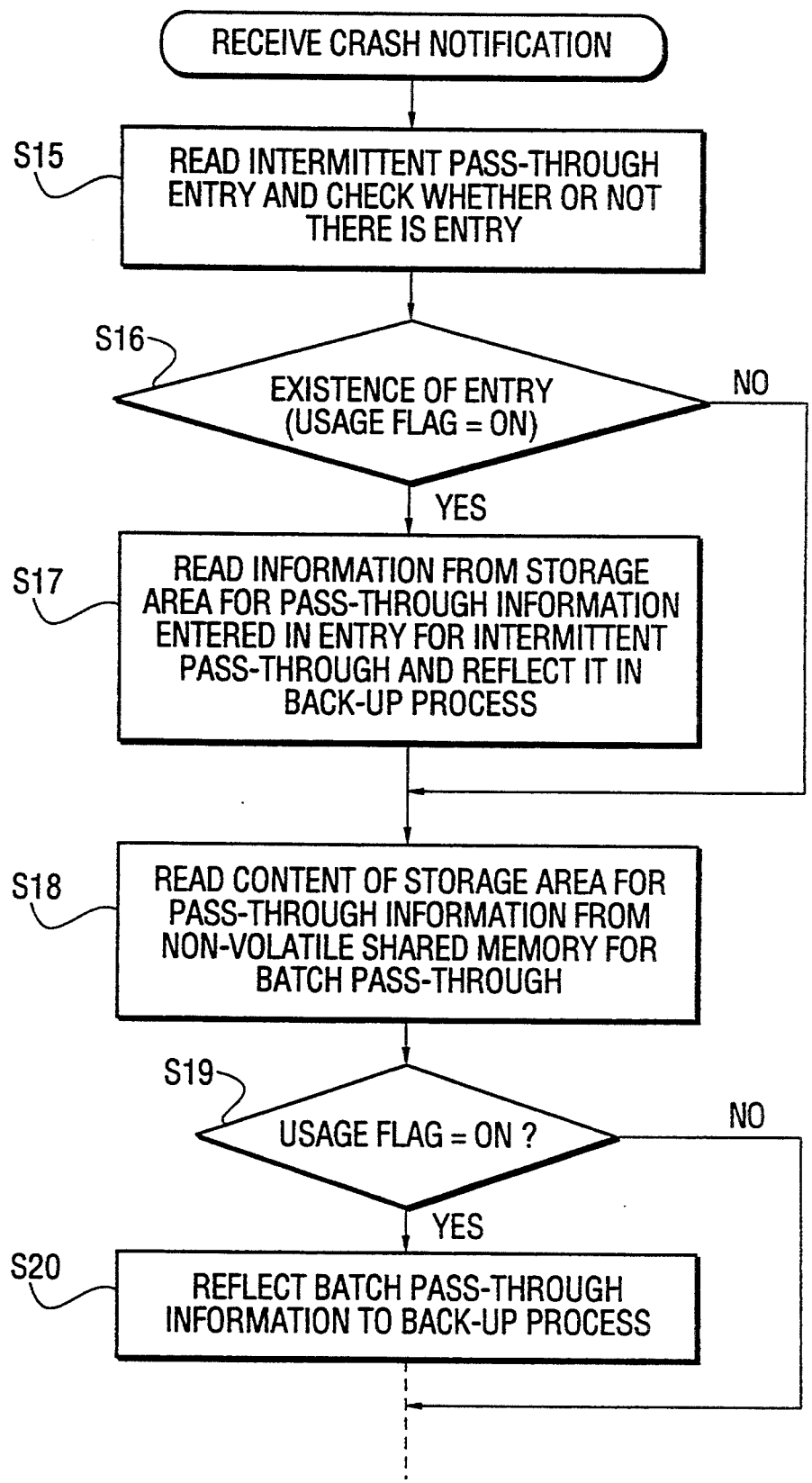
FIG. 7 is a processing flow chart of the back-up process related to the first embodiment of this invention.

FIG. 3 shows an example of a system to which this invention is applied. FIG. 4 shows an example of a data structure of the pass-through information related to the embodiment of this invention. FIG. 5 shows the processing flow of an actual process during an ordinary operation related to the embodiment of this invention. FIG. 6 shows the processing flow of a back-up process during an ordinary operation related to the embodiment of this invention. FIG. 7 shows the processing flow of a back-up process at a crash time related to the embodiment of this invention.

This invention is applicable to the combined system shown in FIG. 3, for example. In FIG. 3, the same alphanumerics as in FIG. 2 correspond to the same components. 20 is a non-volatile shared memory for a batch pass-through. 21 is a non-volatile shared memory for an intermittent pass-through. 22-1 and 22-2 are processor modules (PM) each equipped with a CPU, a memory and so forth. 23 is a processing part for writing pass-through information. 24 is a judging part for an intermittent pass-through. 25 is a directing part for an intermittent pass-through. 26 is a processing part for a batch pass-through at a crash time. 27 is a processing part for an intermittent pass-through. 28 are buses.

Processor modules 22-1 and 22-2 are physical units that can exclusively use a CPU and a memory. Buses 28 are data transmission passes that interconnect among processor modules and that connect the non-volatile shared memory 10 and the processor module.

Established within the non-volatile shared memory 10 are an area of the non-volatile shared memory for a batch pass-through 20 storing batch pass-through information and an area of the non-volatile shared memory for an intermittent pass-through 21 storing intermittent pass-through information.

In the example of FIG. 3, the processor modules 22-1 and 22-2 each have a control monitor for process execution within a respective processor module unit, and under this monitor's control the actual process 11 is operating within the processor module 22-1 and the back-up process 12 is set in the processor module 22-2 and stands-by.

When the demand to write the pass-through information due to a change in the resource information is made, the processing part for writing pass-through information 23 in the actual process 11 judges the sort of resource information, and writes the one in the first group to the non-volatile shared memory for a batch pass-through 20, and writes the one in the second group to the non-volatile shared memory for an intermittent pass-through 21.

Furthermore, the judging part for an intermittent pass-through 24 determines whether an intermittent pass-through processing is currently necessary or not, and it directs the back-up process 12 to receive intermittent pass-through via a directing part for intermittent pass-through 25 when the change amount exceeds the predetermined value and a pass-through is necessary.

The back-up process 12 begins processing of the pass-through resource information either by a crash notification of the actual process 11 from a fault detection part not shown in the drawing or by a directive from the directing part for the intermittent pass-through. It processes pass-through resource information via the processing part for a batch pass-through 26 at the crash notification, as shown in FIG. 2B. It processes pass-through resource information via the processing part for an intermittent pass-through 27 at the directive for an intermittent pass-through by referring to the non-volatile shared memory for an intermittent pass-through 21, as shown in FIG. 2A.

The data structure of the batch pass-through information stored in the non-volatile shared memory for a batch pass-through 20 is shown in FIG. 4A. *1 is a usage or in-use flag for showing whether the information is valid or not. *2 is a storage area for information classification.

The intermittent pass-through information stored in the non-volatile shared memory for an intermittent pass-through 21 is controlled using an entry for an intermittent pass-through, as shown in FIG. 4B. *1 is a usage flag for showing whether the information is valid or not. *2 is a storage area for information classification. Each entry registers one pass-through worth of information. The information classification refers to pass-through information during a data transmission, or during establishing of a connection, or upon completion of a connection. As described before, the pass-through information during a data transmission, while establishing a connection, etc. is information for a batch pass-through, whereas the pass-through information about completion of a connection is information for an intermittent pass-through.

Next, concrete processing contents of the actual process 11 and the back-up process 12 in the first embodiment of this invention will be elaborated.

During an ordinary operation, when the demand to write resource information in the non-volatile shared memory 10 is made, the actual process 11 begins processing, as shown in FIG. 5. S1–S9 in the following elaboration correspond to the processings S1–S9 shown in FIG. 5.

S1 judges whether or not a demand to write resource information in the non-volatile shared memory 20 is actually one to write it in the non-volatile shared memory for a batch pass-through 20 shown in FIG. 3. In other words, S1 judges whether the resource information belongs to the first group (for batch processing) or the second group (for intermittent processing). An intermittent pass-through case goes on to a processing S4.

S2 acquires a storage area for pass-through information in the non-volatile shared memory for a batch pass-through 20 in a batch pass-through case.

S3 turns ON the usage flag in the storage area for pass-through information, sets the information classification, and writes the pass-through information demanded to be written in the storage area for pass-through information. It then finishes its own processing.

S4 acquires a storage area for pass-through information from the non-volatile shared memory for an intermittent pass-through 21 in an intermittent pass-through case.

S5 writes pass-through information in the storage area for pass-through information.

S6 makes an entry for an intermittent pass-through in use and makes an entry in a storage area for pass-through information. Then, S6 turns ON the usage flag designating that the storage area for pass-through information is used.

S7 judges whether the entries for an intermittent pass-through reach a predetermined value. If they reach the predetermined value, a processing S9 is executed.

S8 invokes time monitoring with a timer, if they do not reach the predetermined value. The intermittent pass-through in the embodiment of this invention is made, when there is no intermittent pass-through after a certain time period has elapsed since the last intermittent pass-through information is written. Therefor, S8 invokes time monitoring with the timer after the last intermittent pass-through information is written. S8 stops its own processing after this invoking of the time monitoring. Meanwhile, after said invoking of the time monitoring, when a TIME OUT signal is received, processing S9 is executed.

S9 directs the back-up process 12 to intermittently take over resource information and stops its own processing.

When the back-up process 12 receives a directive to intermittently take over the resource information from the actual process 11, the back-up process 12 executes processings $10 and $11 shown in. FIG. 6.

S10 reads the pass-through information from the storage area for pass-through information entered in an entry for an intermittent-pass-through shown in FIG. 4B.

S11 judges pass-through information by information classification in a storage area for pass-through information, reflects it to the back-up process 12 and turns OFF the usage flag. S11 then stands by for the next instruction.

The back-up process 12 executes processings S15–S20 shown in FIG. 7 by activating the processing part for a batch pass-through at a crash time 26, when it receives a crash notification of the actual process 11.

S15 reads an intermittent pass-through entry from the non-volatile shared memory for an intermittent pass-through 21 and checks whether or not there is an entry of registered pass-through information.

S16 advances to a processing S17 if the usage flag is ON and skips it if the usage flag is OFF. The usage flag ON indicates the existence of an entry.

S17 reads information from the storage area for pass-through information entered in the entry for an intermittent pass-through and reflects it in the back-up process 12.

S18 reads the content of the storage area for pass-through information from the non-volatile shared memory for a batch pass-through 20.

S19 judges whether the usage flag of the storage area for the pass-through information is ON or not. S19 advances to the next processing S20, if the usage flag is ON.

S20 reflects batch pass-through information to the back-up process 12. If all the above pass-through processings are completed, the back-up process 12 resumes its tasks as the actual process.

Through those procedures, some part of the information in the second group of the actual process is passed through by intermittent processings during an ordinary operation; and the remaining part, i.e. the information in the first group and the remaining information in the second group, is passed through at a crash time. By passing through only such remaining information instead of all information, the amount of information to be passed through at the crash time is less. Therefore, all such information is passed through in a shorter time period. Since pieces of information in the second group have less frequencies of change than those in the first group, there are few chances to keep the actual process halted. This provides an efficient operating environment.

Figure 8:
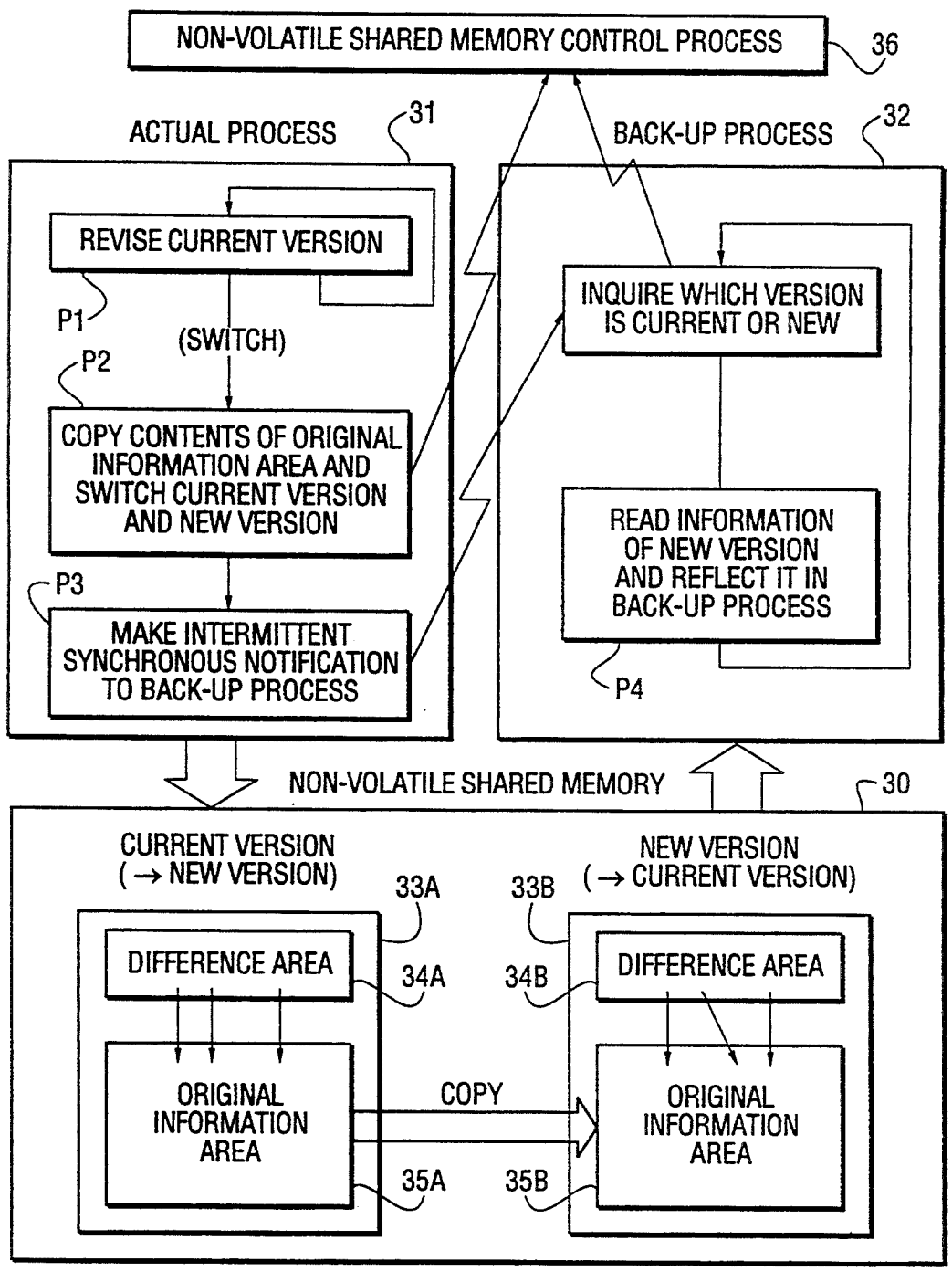
FIG. 8 is a drawing which explains the second principle of this invention.

FIG. 8 is a drawing for explaining the second principle of this invention.

In FIG. 8, 31 is an actual process taking place during an ordinary operation, 32 is a back-up process for continuing to handle tasks at a fault time of the actual process 31, 30 is a non-volatile shared memory, 33A and 33B are storage areas for pass-through information respectively called a current version and a new version, 34A and 34B are difference areas, 35A and 35B are original information areas, and 36 is a non-volatile shared memory control process.

The non-volatile shared memory 30 is a memory device whose memory contents are assured, even if the execution of the actual process 31 or the back-up process 32 halts. It may consist, for example, of components like semiconductor memory devices with a power source of a different system.

Pass-through resource information, such as that about the operating environment of the actual process 31, is set sequentially in the non-volatile shared memory 30, and the back-up process 32 builds its operating environment beforehand, so that the back-up process 32 can be substituted for the actual process 31 at 31's fault time to handle 31's tasks.

In this invention, the area of the non-volatile shared memory 30 in which this pass-through information is set has a dual structure with the current version 33A and the new version 33B.

Both the current version 33A and the new version 33B have original information areas 35A and 35B, respectively, for storing the information to be transmitted from the actual process 31 to the back-up process 32 and difference areas 34A and 34B, respectively, for storing the changed information.

Through a processing P1, the actual process 31 revises the contents of the original information area 35A of the current version 33A and sets the information (about which information in its original information area 35A was changed) in the difference area 34A, when pass-through information such as that about the operating environment is generated.

A processing P2 copies the contents of the original information area 35A to the original information area 35B, when a certain time period has elapsed or the volume of change reaches a predetermined value. At this time, the difference area 34A is not copied. Next, it asks non-volatile shared memory controlling process 36 for a processing to switch the current version 33A to a new version and the new version 33B to a current version.

Then, a processing P3 makes an intermittent synchronous notification, whose meaning is asking to reflect the pass-through information, to the back-up process 32.

Meanwhile, the back-up process 32 reads out contents from the new version 33B and reflects them in the back-up process 32 to prebuild its own operating environment, while the actual process 31 performs writing into the current version 33A.

When a system is designed, a time interval and an amount of information change, which are factors in invoking an intermittent synchronous processing, are determined. Thus, the back-up process 32 completes its own advance building of the operating environment from the new version 33B, while the actual process 31 performs writing into the current version 33A.

When the actual process 31 makes an intermittent synchronous notification, since new pass-through information is notified, the back-up process 32, by judging that the former current version 33A is the current new version after inquiring to the non-volatile shared memory control process 36, makes the area of the current new version as new read-out object of the pass-through information.

If information is passed through intermittently from the actual process 31 to the back-up process 32 by making an area of the non-volatile shared memory 30 a single structure, tasks are interrupted because the actual process 31 is kept waiting while the back-up process 32 is read out.

In this invention, since an area for pass-through information in the non-volatile shared memory 30 is split into the current version 33A and the new version 33B and this dual structure area is used cyclically by switching, the actual process 31 can achieve a good performance.

If the current version and the new version are simply switched, there is a possibility of forcibly switching before the back-up process 32 finishes the read-outs from the new version 33B. In this case, the part not yet read is not reflected in the back-up process 32. This is considered to be a very rare case, but if it actually does happen, normal processings cannot continue.

Therefore, in this invention, the actual process 31 adds a sequence number (increment of one for every notification) in an intermittent synchronous notification, so that the the back-up process 32 can judge, in particular, whether intermittent synchronous processings are being made in the right cycle.

This enables the back-up process 32 to judge that an exact pass-through cannot be executed with only the pass-through information of the changed parts in the difference area, and to thereby execute a pass-through processing from the original information area when the intermittent synchronous processings are not in an order of the sequence number. The information in the original information area 35A is copied to the original information area 35B of the next current version 33B at a switching time between the current version and the new version, so that all the pass-through information is always kept.

Figure 9:
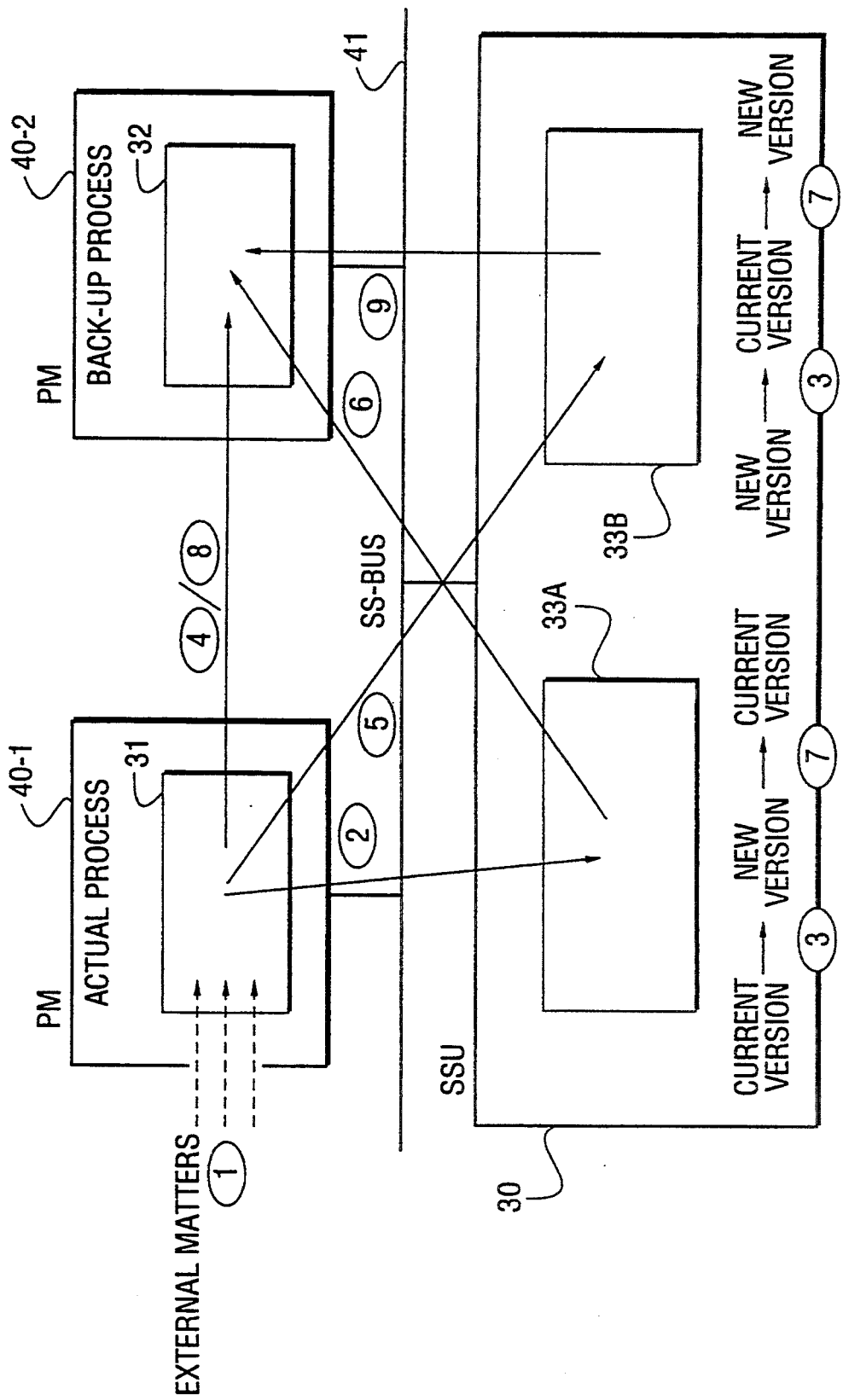
FIG. 9 shows a second preferred embodiment of this invention.

FIG. 9 shows a second preferred embodiment of this invention.

This invention is applicable to a combined system shown in FIG. 9, for example. In FIG. 9, the same alphanumerics as in FIG. 8 correspond to each other, 40-1 and 40-2, respectively, are processor modules (PM: physical units that can exclusively use a CPU or a memory) and 41 are buses (SS-BUS:transmission paths that either interconnect among PMs or connect between a PM and a non-volatile shared memory 30).

In a system shown in FIG. 9, the following processings are carried out in the order shown to pass through resource information.

(1) External matters are input to the actual process 31 from other processes within the same PM or from other processes within the other PM.

(2) The actual process 31 memorizes information on inputting of external matters in its internal control table and writes it to the current version 33A of the non-volatile shared memory 30 to pass through the same information.

(3) When a certain time period has elapsed or the changed volume reaches a certain predetermined value, necessary information is copied to 33B and the current version and the new version are switched. This switching is directed by the non-shared volatile memory control process 36 which can be installed in another PM not shown in FIG. 9 or in another PM having an actual process. In this case, the non-volatile shared memory control process 36 is also switched, when the back-up process becomes the actual process.

(4) The back-up process 32 is directed to read pass-through information by a message transmission.

(5) Since the external matters notified to the actual process 31 are generated on an on-going basis, the actual process 31 restarts to write pass-through information to the current version after the switching (the former new version 33B).

(6) Notified by the processing (4), the back-up process 32 reads out the information written by the actual process 31 in the processing (2) and reflects this information to the back-up process 32.

(7) When the information in the processing (5) is written to the current version after the switching (the former new version 33B) over a predetermined value or a certain time period has elapsed, the current version and the new version are switched again. The relationship between the current version and the new version reverts back to the state before the switching in the processing (3).

(8) After directing the back-up process 32 to read pass-through information by a message transmission like the above processing (4), the actual process 31 restarts to write the pass-through information to the current version 33A after switching within the non-volatile shared memory 30.

(9) Notified by the processing (8), the back-up process 32 reads out the information written by the actual process 31 in the processing (5) from the non-volatile shared memory 30 and reflects this information in itself.

By repeating the cycle of the above processings (1) through (9), the sameness of the data in the non-volatile shared memory 30 is assured.

FIG. 10 shows the data structure in a non-volatile shared memory area related to the second embodiment of this invention.

The data structure of the non-volatile shared memory area is made to consist of a dual structure with the current version 33A and the new version 33B as shown in FIG. 9 to enable intermittent transmission of the pass-through information from an actual process to a back-up process. This information pass-through is triggered by elapsing of a certain time period or accumulation of information volume over a certain predetermined value, but it relates only to the changed information instead of all information in the area of the non-volatile shared memory 30.

The difference areas 34A and 34B enable the identification of the changed information at a back-up process and they store pointers to the original information areas 35A and 35B, where the actual pass-through information, i.e. all the information to be transmitted from the actual process to the back-up process, is stored. However, since a part of such information that becomes unnecessary depending on the tasks of the actual process is abandoned during this procedure, the original information areas 35A and 35B will not overflow.

The following is an explanation of the communication control process taken as an example of an application of this invention.

The communication control process needs to transmit the information as to which characteristic of the communication resource was activated, when communication resource, such as a data transmission line or a data link, is activated. Also, when the communication resource is deactivated, the communication control process needs to transmit the information as to which resource corresponding to the information transmitted by the control processing was deactivated. After the notification of this deactivation, the pass-through information such as resource characteristics becomes no longer necessary, and needs not be maintained in the original information areas 35A and 35B.

The current version 33A is an area for the actual process for writing the pass-through information. The new version 33B is an area for the back-up process for reading out the pass-through information. Accordingly, the pointer format of the current version from the difference area 34A to the original information area 35A and the pointer format of the new version from the difference area 34B to the original information area 35B are different.

FIGS. 11A through 11F are a processing example related to the second embodiment of this invention. A process flow of the actual process and the back-up process is shown in detail in FIGS. 11A through 11F, where the activating and deactivating of a data transmission line, which is a communication resource, are taken as the example. To simplify explanation, the entry numbers for the difference areas 34A and 34B are assumed to be 2 and the information volume in the original information areas 35A and 35B is assumed to be 4.

(1) When a command demands an actual process to activate a data transmission line L1, the actual process acquires an unused area from the current version's original information area 35A and sets characteristic information the data transmission line L1 is supposed to transmit in the unused area, as well as setting in the difference area 34A, an activation demand code and a pointer to the information area of the data transmission line L1 within the original information area 35A.

Figure 11A:
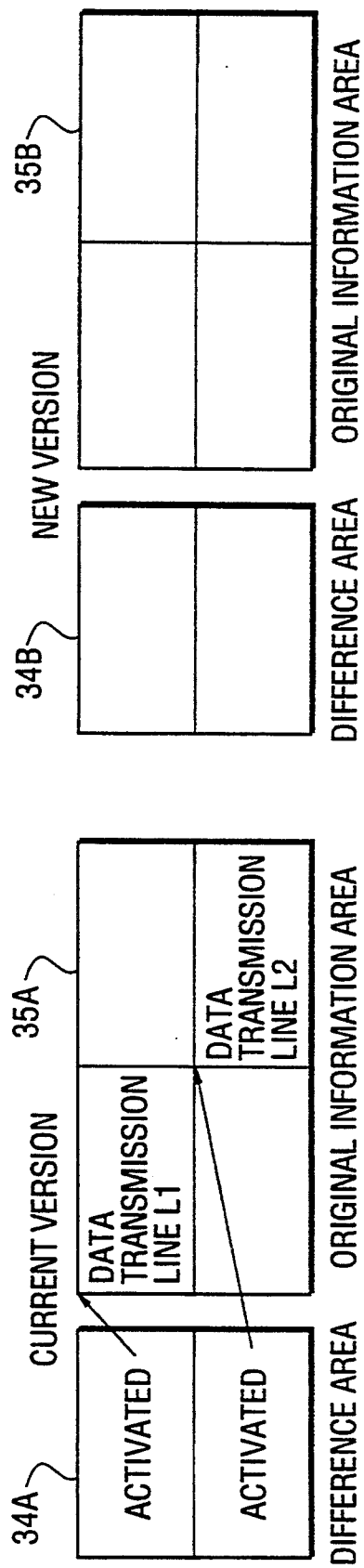

(2) When a demand to activate a data transmission line L2 is made, pass-through information is set, as in the above processing (1). This makes the current version's difference area 34A and original information area 35A as shown in FIG. 11A.

(3) The actual process begins an intermittent synchronous processing, because the difference area 34A is full.

Figure 11B:
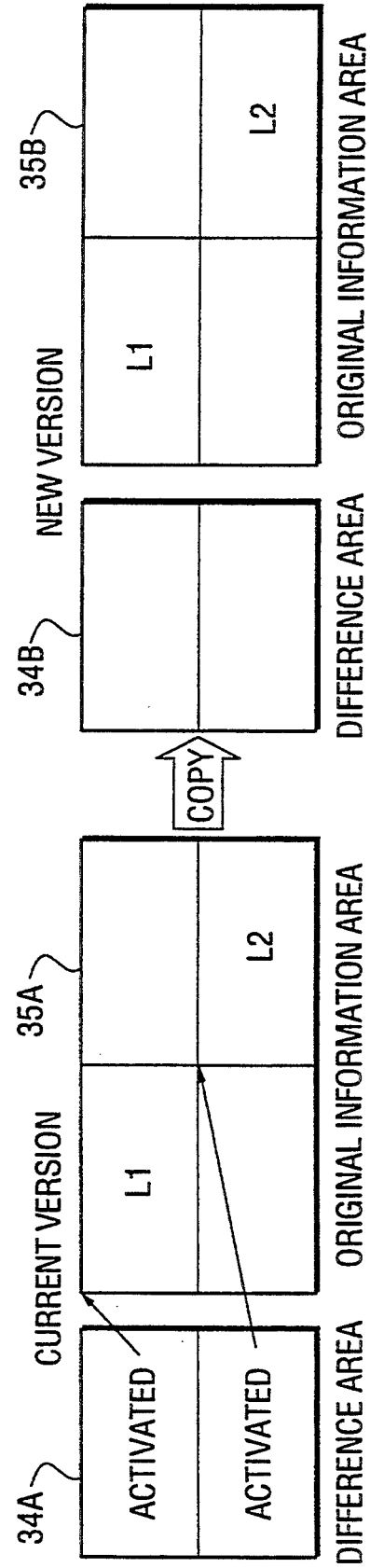

(4) First, all the necessary information in the original information area 35A of the current version is copied to the original information area 35B of the new version, as shown in FIG. 11B.

Figure 11C:
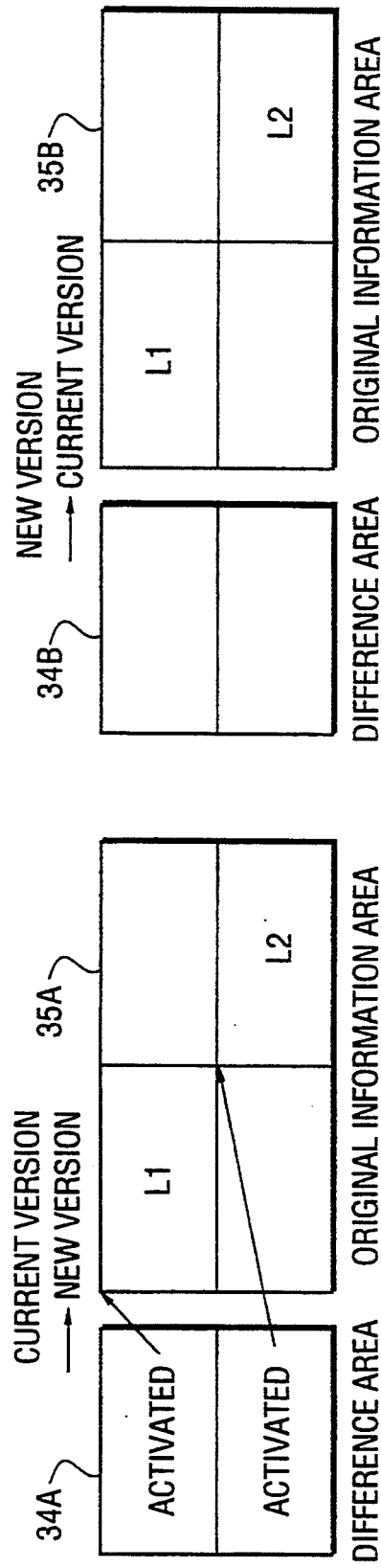

(5) Next, the current version and the new version are switched, as shown in FIG. 11C.

(6) Then, the back-up process is given an intermittent synchronous notification.

(7) The back-up process comes to know of the changed information, i.e. activation of the data transmission lines L1 and L2, from the information of difference area 34A that has become the new version by the above intermittent synchronous notification and reflects it in the back-up process. The information in the difference area 34A after reflection is cleared or nullified.

(8) The actual process sets the pass-through information affecting the difference area 34B and the original information area 35B of the new current version, concurrently with the processing (7) in the back-up process. For example, if a command directs a demand to deactivate the data transmission line L2, a deactivation demand code is set in the difference area 34B and a pointer is set in the original information area 35B where the information relating to the data transmission line L2 is stored.

Figure 11D:
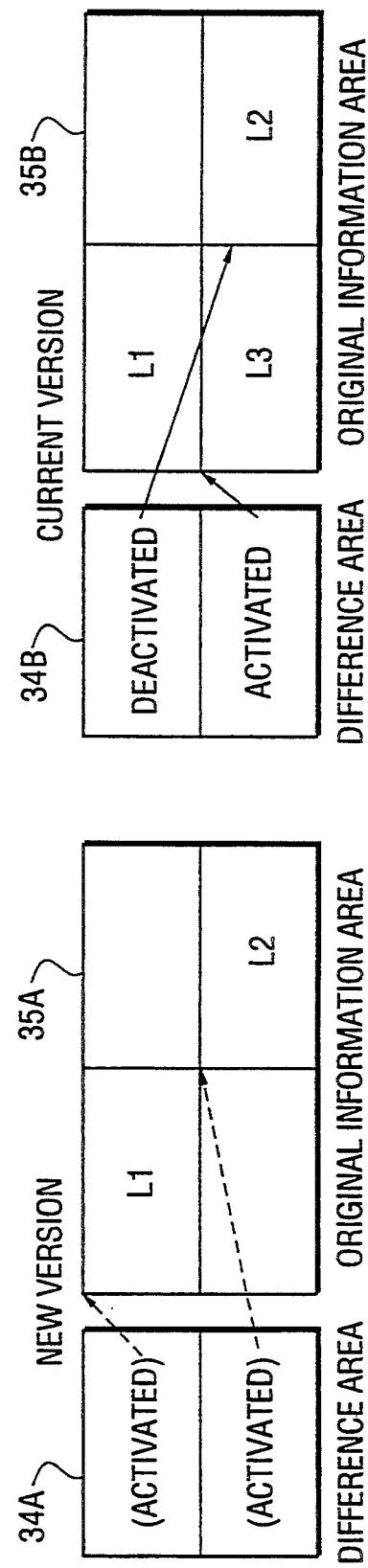

(9) In addition, when there is an activation demand to a data transmission line L3, the pass-through information is set as in the above processing (1). This makes the state of the current version's difference area 34B and original information area 35B as shown in FIG. 11D.

(10) The actual process begins an intermittent synchronous processing, since the difference area 34B is filled.

(11) First, all the necessary information in the current version's original information area 35B is copied to the new version's original information area 35A.

(12) At this time, because the deactivation makes the area within the original information area 35A used by the data transmission line L2 no longer necessary, it is released as an unused area, as shown in FIG. 11E.

(13) The current version and the new version are switched, as shown in FIG. 11F.

(14) Then, an intermittent synchronous notification is made to the back-up process.

(15) By this intermittent synchronous notification, from the information of the difference area 34B that has become a new version, the back-up process comes to know of the deactivation of the data transmission line L2 and activation of the data transmission line L3 and reflects this information in itself.

(16) The actual process sets the pass-through information aiming at the difference area 34A and the original information area 35A of the new current version, concurrently with the processing (15) in the back-up process. And similar processings as the above from the processing (1) are done cyclically.

Deactivation herein refers to abandoning of the resource information as a result.

As discussed before, this invention has benefits in that the processings by the actual process can avoid being kept on hold by intermittent prebuilding of the operating environment in the back-up process and that the loss of pass-through information due to a delay in the processing by the back-up process can be prevented. Thus, it makes such thing as a communication control program fault tolerant with certainty.

That is, that this invention enables not only the performance maintenance during an ordinary operation of the actual process but also the switching performance improvement at a crash time of the actual process.

What is claimed is:

1. A system to pass through resource information in a computer system having an actual process, a back-up process, and a shared memory to which said actual and back-up processes are connected, said actual process having information to be stored in said shared memory and to be passed through to said back-up process, said back-up process being passed the contents of said shared memory and performing an operation as a new actual process after being passed said contents of said shared memory when said actual process is not operable, said system comprising:

means for providing two sets of areas in said shared memory, each being composed of an original information area that stores information that is transmitted from said actual process to said back-up process and a difference area that memorizes the information related to a change when said actual process changes said original information area;

said back-up process reading out information related to said resource information stored in the difference area of one of said two sets of areas and passing through the information related to said change;

and said actual process storing the changed information that is to be transmitted to said back-up process in an original information area of said back-up process and the information related to said change in a difference area of said back-up process;

means for copying the original information memorized in the original information area of said other set by at least one of the criteria of a preset time interval being reached and a preset volume stored in said difference area being reached; and means for switching two sets of areas each having said actual process and said back-up process so that said back-up process updates data.

2. The system to pass through resource information according to claim 1, wherein said actual process notifies said back-up process of said switching when a used memory of the two sets is switched, and said back-up process passes through information related to said change by reading out said resource information stored in the difference area of the area of the other set switched.

3. The system to pass through resource information according to claim 2, wherein the information stored in said difference area related to said change refers relates to changed data in said original information area.

4. The system to pass through resource information according to claim 3, wherein said area of said actual process switches at a crash time, said back-up process carries over the final resource information from said set formerly used by said actual process, and becomes the actual process.

5. A system to pass-through resource information in a computer system having an actual process, a back-up process, and a non-volatile shared memory to which said actual and back-up processes are connected, said actual process having information to be stored in said shared memory and to be passed through to said back-up process, said back-up process being passed the contents of said shared memory and performing an operation as a new actual process after being passed said contents of said non-volatile shared memory when said actual process is not operable, said system comprising:

means for enabling an area of the non-volatile shared memory to which the resource information is set, to comprise a dual structure with a current version and a new version;

means for setting original information areas storing the information that is transmitted from the actual process to the back-up process and difference areas storing information related to a change in the original information area in a current version and a new version, respectively;

means for the actual process writing into the current version;

means for the back-up process reading from the new version;

means for enabling the actual process to copy the content of the original information area of the current version to the original information area of the new version and to switch a current version to a new version and a new version to a current version after elapse of a preset time period or after a preset volume threshold stored in said difference area is reached; and means for enabling the actual process to notify the back-up process of the switching between the current version and the new version.

6. A method to pass through resource information in a computer system having an actual process, a back-up process, and a shared memory to which said actual and back-up processes are connected, said actual process having information to be stored in said shared memory and to be passed through to said back-up process, said back-up process being passed the contents of said shared memory and performing an operation as a new actual process after being passed said contents of said shared memory when said actual process is not operable, said method comprising the steps of:

classifying said information to be passed-through into first information changing relatively frequently during a normal operation and second information changing relatively frequently during a normal operation; and collectively passing said first information to said back-up process at the crash time of said actual process, and periodically passing said second information to said back-up process at least at predetermined time intervals or when the amount of differences in said second information has reached a predetermined value.

7. The system to pass through resource information according to claim 6, wherein each of said first information and second information include an amount of information which can be read in less time than a time interval defined by the predetermined time interval.

8. The system to pass through resource information according to claim 7, wherein said resource information has a flag showing the use of a resource, and said batch pass-through affects resource information when said flag is ON.

9. The system to pass through resource information according to claim 7, wherein said intermittent pass-through affects resource information with the flag turned ON to show usage in an intermittent pass-through entry.

10. The system to pass through resource information according to claim 9, wherein at the completion of said intermittent pass-through, the flag showing the usage set in said pass-through entry is turned OFF.

11. A System to pass through resource information in a computer system, having an actual process and a back-up process, wherein the back-up process continues handling tasks instead of the actual process when the actual process is not operable to pass through the information from the actual process to the back-up process, said system comprising:

means for dividing the resource information passed through from the actual process to the back-up process into two groups by the change frequencies of resource information;

means for passing the resource information in a first group through in a batch to the back-up process at a crash time of the actual process; and means for passing the resource information in a second group through intermittently to the back-up process after preset time intervals or after the volumes of changed information reach a preset threshold.

12. A method for passing-through resource information used in a computer system with an actual process and a back-up process that passes through resource information necessary to continue handling tasks stored in a non-volatile shared memory connected to said actual process and said back-up process, from said actual process to said back-up process at least when said actual process is not operable, wherein two sets of areas are provided in said non-volatile share memory, each being composed of an original information area for storing information transmitted from said actual process to said back-up process and a difference area for storing the information related to a change when said actual process changes said original information area, said method comprising the steps of:

reading out information related to said resource information stored in the difference area of one of said two sets, and passing through the information related to said change, said reading out being performed by said back-up process;

storing by said actual process the changed information to be transmitted to said back-up process in the original information area of said back-up process and the information related to said change in the difference area of said back-up process;

copying the original information stored in the original information area of said other set by at least one of the criteria of a preset time interval being reached or a preset volume stored in said difference area being reached; and switching two sets of areas between said actual process and said back-up process.

13. A computer system comprising:

a first processor module to perform an actual process;

a second processor module to perform a back-up process corresponding to the actual process, based on a failure of the actual process; and a non-volatile shared memory coupled to the first and second processor modules, to store first and second information associated with the actual process, the first and second information being written into the non-volatile shared memory by the first processor module, the first information changing relatively frequently and the second information changing relatively infrequently, the second processor module reading at least some of the second information from the non-volatile shared memory during a normal operation of the actual process, and the second processor module reading the first information and any portion of the second information not previously read by the second processor module, based on the failure of the actual process.

* * * * *

UNITED STATES PATENT AND TRADEMARK OFFICE
CERTIFICATE OF CORRECTION

PATENT NO. : 5,446,875
DATED : August 29, 1995
INVENTOR(S) : Yukihisa OGISU et al.

It is certified that error appears in the above-indentified patent and that said Letters Patent is hereby corrected as shown below:

Column 6, line 4, delete the paragraph indentation; and line 53, delete "$10" and insert --S10-- and delete "$11" and insert -- S11--.

Column 10, line 40, after "source" insert –,– and delete "to"; and line 41, after "processing" insert –,–.

Signed and Sealed this

Twenty-third Day of January, 1996

Attest:

BRUCE LEHMAN

*Attesting Officer*       *Commissioner of Patents and Trademarks*